(No Model.)
G. H. HARVEY.
FRUIT JAR.
No. 388,488. Patented Aug. 28, 1888.
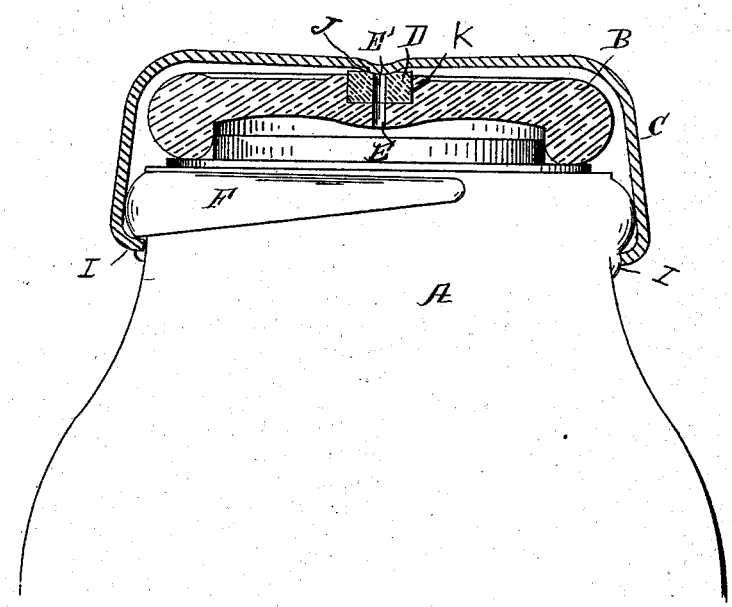
WITNESSES:
INVENTOR.

UNITED STATES PATENT OFFICE.

GEORGE H. HARVEY, OF PITTSBURG, PENNSYLVANIA, ASSIGNOR TO ALBERT C. ELLIS, OF SAME PLACE.

FRUIT-JAR.

SPECIFICATION forming part of Letters Patent No. 388,488, dated August 28, 1888.

Application filed June 25, 1887. Serial No. 242,537. (No model.)

*To all whom it may concern:*

Be it known that I, GEORGE H. HARVEY, of Pittsburg, in the county of Allegheny and State of Pennsylvania, have invented a new and useful Fruit-Jar; and I do hereby declare the following to be a full, clear, and exact description thereof.

In the construction of preserve-jar fastenings great trouble has been experienced in making them air tight, and in order to do this expensive and complicated devices have been resorted to. These, it is true, have accomplished the object sought for; but objection is made as to their cost.

My invention relates to an improvement in fruit-jar fasteners; and it consists in a jar having spiral lugs, a lid having a recess below which is a vent, a gasket having a vent, said gasket being fitted in the recess, and a clamp having a portion of its lower face enlarged, all combined, arranged, and operating substantially as hereinafter described.

To enable others skilled in the art with which my invention is most nearly connected to make and use it, I will proceed to describe its construction and operation.

In the accompanying drawing, which forms part of my specification, the figure is a side elevation of a fruit-jar with its lid and clamp shown in section.

A represents the jar; B, the lid; K, the recess having a vent, E, all being of the ordinary construction.

C represents the clamp, which is made of steel or other suitable material, and is provided on its under face with a convex or swelled portion made to fit and press upon the rubber gasket D, placed in the recess K in the cover.

The operation of my invention is as follows: Fruit or other article to be preserved is placed in the jar and the lid is fitted to it in the usual manner. A gasket, D, made of gum or other suitable material, is then placed in the recess in the lid, in which is the vent E. Said gasket D is just of sufficient size to fill the recess. The clamp C is then placed in position, its lips I engaging with the spiral lugs F. The clamp, being turned, will travel on the spiral lugs and press down upon the lid and force it on the jar tightly, and the convex or swelled portion J of the clamp will press on the gasket D, and thereby hermetically seal it.

Having thus described my improvement, what I claim is—

A jar having spiral lugs, a lid having a recess below which is a vent, a gasket having a vent, said gasket being fitted in the recess, and a clamp having a portion of its lower face enlarged, all combined, arranged, and operating with relation to each other substantially as herein described, and for the purpose set forth.

In testimony whereof I have hereunto set my hand this 21st day of June, A. D. 1887.

GEO. H. HARVEY.

Witnesses:
C. H. HAMILTON,
L. S. MCKEEVER.